United States Patent [19]

Dill

[11] Patent Number: 4,724,354

[45] Date of Patent: Feb. 9, 1988

[54] IMAGE INTENSIFIER FOR PRODUCING A COLOR IMAGE HAVING A COLOR SEPARATION FILTER SEQUENTIALLY PASSING VISIBLE BLUE LIGHT AND ITS SECOND ORDER WAVELENGTHS, VISIBLE GREEN LIGHT AND ITS SECOND ORDER WAVELENGTHS, AND VISIBLE RED LIGHT

[75] Inventor: James M. Dill, Pompano Beach, Fla.

[73] Assignee: EOL3 Company, Inc., Ft. Lauderdale, Fla.

[21] Appl. No.: 859,423

[22] Filed: May 5, 1986

[51] Int. Cl.$^4$ .................. H01J 31/56; H04N 5/33; H04N 9/04

[52] U.S. Cl. .................. 313/371; 313/474; 313/524; 313/542; 250/213 VT; 358/41; 358/42; 358/113; 358/211

[58] Field of Search ......... 313/103 R, 103 CM, 104, 313/105 R, 105 CM, 112, 371, 373, 376, 377, 379, 380, 399, 400, 474, 478, 524, 525, 530, 542, 543, 544, 527, 528; 250/213 VT; 358/42, 41, 43, 44, 50, 55, 113, 211

[56] References Cited

U.S. PATENT DOCUMENTS

| | | | |
|---|---|---|---|
| 3,812,526 | 5/1974 | Tan | 358/42 |
| 4,016,597 | 4/1977 | Dillon et al. | 358/41 |
| 4,085,421 | 4/1978 | Gilmour | 358/41 |
| 4,437,111 | 3/1984 | Inai et al. | 358/44 |

FOREIGN PATENT DOCUMENTS

| | | | |
|---|---|---|---|
| 0053530 | 6/1982 | European Pat. Off. | 313/103 CM |
| 56850 | 5/1977 | Japan | 313/524 |
| 106356 | 8/1981 | Japan | 313/524 |
| 10985 | 1/1983 | Japan | 358/42 |
| 17795 | 2/1983 | Japan | 358/42 |
| 90887 | 5/1983 | Japan | 358/55 |

OTHER PUBLICATIONS

Fischer, Edward, "Obtaining Color Pictures with an Image Intensifier Tube", *RCA Technical Notes*, RCA TN No. 556, Mar. 1964, 2 pages.

Stern, M. A., et al., "Low-Light-Level Image-Amplifying Device with Full Color Capability", Journal of the SMPTE, vol. 83, No. 3, Mar. 1974, pp. 185–189.

NHK Technical Research Laboratories, "High-Sensitivity 3 Image Intensifier Saticon Color Camera", Jun. 1979, 2 pages, (Author and Publication Unknown).

Corion Corporation, Holliston, Mass., *Corion Optical Filters and Coatings*, Catalog, Aug. 1985, pp. 16–21, 50–51, 84–89.

Primary Examiner—James J. Groody
Assistant Examiner—Randall S. Svihla
Attorney, Agent, or Firm—Oltman and Flynn

[57] ABSTRACT

A color separation filter arrangement for an image intensifier having separate blue, green and red filters which respectively have pass bands for visible blue light and its second order wavelengths, visible green light and its second order wavelengths, and visible red light. The blue, green and red filters are interposed individually in succession in the path of incident visible light and infrared energy to the photocathode of the image intensifier. Use of this color separation filter produces a relatively high signal-to-noise ratio at the output of the image intensifier when it is used under night sky illumination.

4 Claims, 4 Drawing Figures

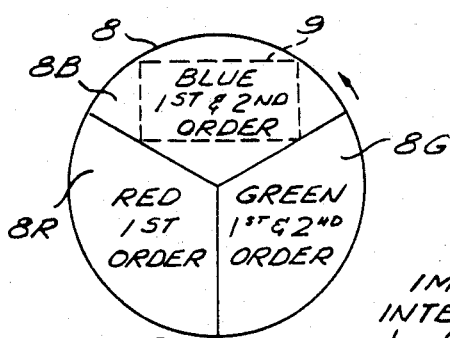
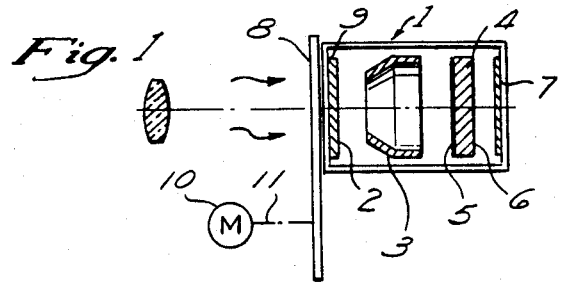
Fig. 1
Fig. 2
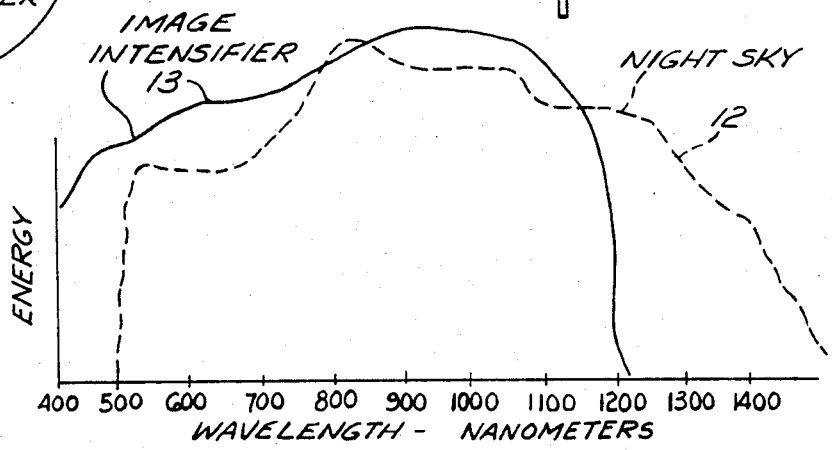
Fig. 3
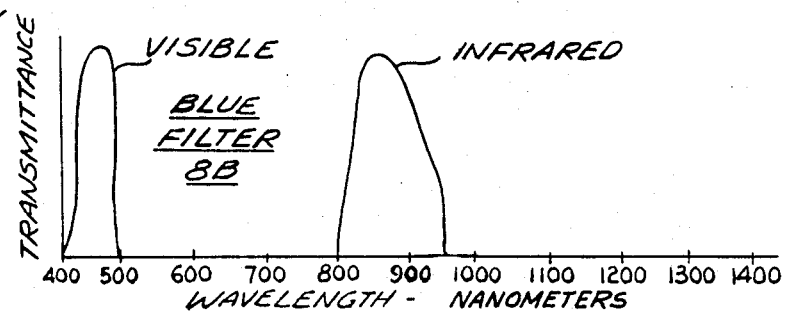
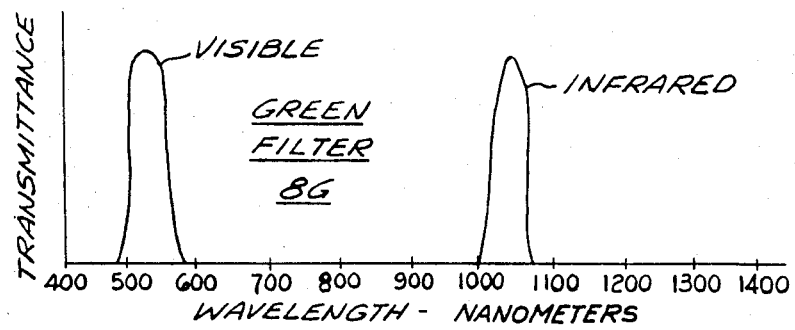
Fig. 4
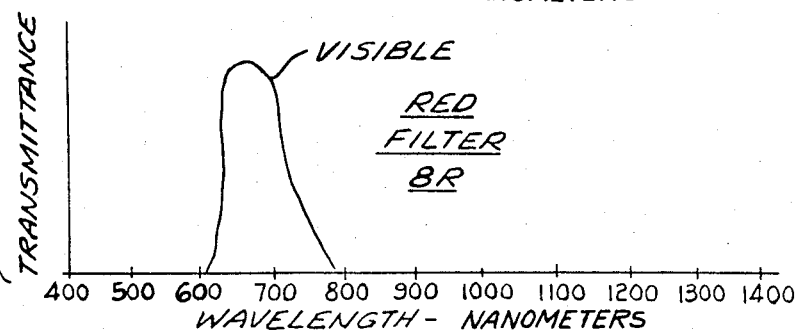

IMAGE INTENSIFIER FOR PRODUCING A COLOR IMAGE HAVING A COLOR SEPARATION FILTER SEQUENTIALLY PASSING VISIBLE BLUE LIGHT AND ITS SECOND ORDER WAVELENGTHS, VISIBLE GREEN LIGHT AND ITS SECOND ORDER WAVELENGTHS, AND VISIBLE RED LIGHT

SUMMARY OF THE INVENTION

This invention relates to a novel filter arrangement for color separation imagery operation of an image intensifier under a night sky.

Attempts to use color separation imagery with image intensifiers under the low illumination provided by a night sky have not been entirely satisfactory because of excessive noise in the output from the image intensifier.

The present invention substantially overcomes this difficulty by taking advantage of the following facts:
 (1) night sky typically has a relatively high level of energy covering most of the visible spectrum and the infrared spectrum; and
 (2) image intensifiers generally have a sensitive response over the visible spectrum and much of the infrared spectrum (including specifically second order blue and green).

In accordance with the present invention, the light image input to the image intensifier is filtered through a complex filter unit which passes, in succession, visible blue and its second order wavelengths (in the infrared spectrum), visible green and its second order wavelengths, and visible red. The intensified visual image on the output screen of the image intensifier has a higher signal-to-noise ratio than was possible in previous attempts to use image intensifiers in color separation imagery systems.

A principal object of this invention is to provide for use under night sky illumination a novel combination of an image intensifier and an input color filter arrangement which produces a relatively high signal-to-noise ratio at the output of the image intensifier.

Further objects and advantages of this invention will be apparent from the following detailed description of a presently preferred embodiment which is illustrated schematically in the accompanying drawings.

DESCRIPTION OF THE DRAWINGS

FIG. 1 is a schematic longitudinal sectional view of an image intensifier provided with the novel filter arrangement of the present invention;

FIG. 2 is a front elevation of a rotatably adjustable disc present presenting the different color segments of the filter in FIG. 1;

FIG. 3 shows in full lines the spectral sensitivity of a typical image intensifier and in dashed lines the spectrum of energy in the night sky, both plotted against the wavelength of the energy; and FIG. 4 shows the band-pass characteristics of the blue, green and red filters in the filter unit at the light input side of the image intensifier of FIG. 1, in accordance with the present invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Referring to FIG. 1, reference numeral 1 designates generally an image intensifier tube of known design which is shown in simplified schematic form here. It has a photocathode 2 at one end which is exposed to incident light, an anode and focusing cone 3, a microchannel plate 4 having an input electrode 5 on its face toward the photocathode and an output electrode 6 on its face away from the photocathode, and a fluorescent output screen 7 at the opposite end. This is a typical "second generation" image intensifier. The optical image formed on the photocathode 2 by the incident light is converted by it into an electron image, which is multiplied by the microchannel plate 4 and applied to the output screen 7, which produces an optical image which is an intensified replica of the optical image on the photocathode.

In one practical embodiment, the photocathode 2 is at $-1750$ volts, the anode and focusing cone 3 is at $+1000$ volts, the input electrode 5 of the microchannel plate 4 is at $+900$ volts and its output electrode 6 is at reference ground, and the output screen 7 is at $+6000$ volts. In a portable image intensifier these voltages are supplied by an internal power supply having a three volt DC power source in the form of two size AA dry cell batteries. This battery voltage is stepped up in the internal power supply to provide the different voltages for the various electrodes of the image intensifier.

In accordance with the present invention, a thin film optical filter unit 8 is located immediately in front of the transparent end wall 9 of the image intensifier tube just ahead of the photocathode 2. As shown in FIG. 2 this filter unit may be in the form of a rotary disc consisting of a blue filter sector 8B, a green filter sector 8G and a red filter sector 8R, each taking up one-third of the disc. Each color sector 8B, 8G and 8R is large enough to be in the path of all energy impinging on the photocathode 2 through the transparent end wall 9 at a particular time during each rotation of the filter disc 8.

The filter disc 8 is driven by a D.C. powered stepping motor shown schematically at 10 in FIG. 1 through a mechanical drive of any suitable design, indicated by the dashed line 11 in FIG. 1. The motor indexes the filter disc rapidly to successive rotational positions 120 degrees apart in which the blue filter 8B, the green filter 8G and the red filter 8R are positioned successively in front of the transparent end wall 9 of the image intensifier. FIG. 2 shows the filter disc in a rotational position in which the blue filter 8B masks the transparent end wall, shown in dashed lines.

If desired, the respective blue, green and red filters may be on flat panels or cards, one closely behind the other, which are slidably operated so that only one at a time covers the end wall 9 of the image intensifier and the other two are retracted. The three color filter panels are actuated in rapid succession, one at a time, to the operative position to provide blue, green and red filtering in sequence.

Each color filter 8B, 8G and 8R is composed of semi-transparent layers separated in succession along the direction of the energy impinging on the photocathode 2 and so arranged as to pass certain wavelength bands with relatively little loss and to reject the other wavelengths substantially completely.

As shown in FIG. 4, blue filter 8B has two pass bands, one for visible blue light and a second for blue second order wavelengths (i.e., infrared energy in the wavelength band twice that of visible blue light); the green filter 8G has two pass bands, one for green light in the visible spectrum and a second for green second order wavelengths (i.e., infrared energy in the wavelength band twice that of visible green light); and the red filter 8R has a single pass band in the visible red spectrum. Each filter 8B, 8G and the 8R rejects all energy wavelengths except those within its pass band or pass bands.

It will be evident that the filter 8 is a spectrally sensitive beam separator for sequentially dividing the incident energy into these components: visible blue and its second order wavelengths, visible green and its second order wavelengths and visible red.

The photocathode 2 of the image intensifier 1 receives sequential color separated images and converts them into an electron image which is multiplied by the microchannel plate 4 and applied to the output screen 7 to produce a visible image which is an amplification of the sequential filtered inputs through the blue, green and red sectors of filter disc 8.

As shown in FIG. 3, a typical night sky may have the energy levels in the visible light and infrared spectrums as shown by the dashed line curve 12. A typical image intensifier has a response to incident energy as shown by the full line curve 13, from which it will be evident that the response drops off sharply at about 1200 nanometers and higher wavelengths. The response of the image intensifier tube is high over the entire visible light spectrum and the infrared spectrum up through twice the wavelength range of visible green light, but it is very low in the infrared spectrum in the wavelength range twice that of visible red light. Therefore, even though infrared energy at wavelengths twice that of visible red light is substantially present in the night sky, the red filter 8R in the present invention rejects it because the image intensifier would not respond significantly to it.

Because of the inclusion of components of the night sky's energy which are in the infrared spectrum, the signal-to-noise ratio of the output from the image intensifier is substantially greater than has been possible previously using color separation imagery in only the visible spectrum under a night sky.

I claim:

1. In combination with an image intensifier having a photocathode,
a filter unit having a first filter means with pass bands for only visible blue light and infrared energy in the wavelength band twice that of visible blue light, a second filter means with pass bands for only visible green light and infrared energy in the wavelength band twice that of visible green light, and a third filter means with a pass band for only visible red light, said filter unit being operatively arranged to position said first, second and third filter means individually in succession in the path of incident energy before it reaches said photocathode.

2. The combination of claim 1 wherein said filter unit is a rotatable disc with first, second and third sectors which respectively provide said first, second and third filter means.

3. In combination with an image intensifier having:
a photocathode for converting an optical image formed by incident energy to an electron image,
an anode and focusing cone,
a microchannel plate for multiplying the electron image produced by said photocathode,
and an output screen for converting the multiplied electron image to an optical image;
means for operating said image intensifier at a high signal-to-noise ratio under a night sky comprising:
a filter unit having a blue filter with pass bands for only blue light in the visible spectrum and infrared energy in the wavelength band twice that of blue light in the visible spectrum, a green filter with pass bands for only green light in the visible spectrum and infrared energy in the wavelength band twice that of green light in the visible spectrum, and a red filter with a pass band for only red light in the visible spectrum, said filter unit being operative to position said blue filter, green filter and red filter individually in succession in the path of incident energy in the visible light and infrared spectrums before it reaches said photocathode.

4. In combination with an image intensifier having a photocathode for converting an incident light image into an electron image, means for multiplying said electron image, and an output screen for receiving the multiplied electron image and converting it into a light image, spectrally sensitive filter means positioned in the path of said incident light image to said photocathode for periodically separating said incident light image, prior to arrival at said photocathode, into a plurality of different visible light wavelength bands and wavelength bands twice those of certain of said visible light wavelength bands.

* * * * *